US006314812B1

(12) United States Patent
Harris (10) Patent No.: US 6,314,812 B1
(45) Date of Patent: *Nov. 13, 2001

(54) APPARATUS AND METHOD FOR BINOCULAR MEASUREMENT SYSTEM

(75) Inventor: David E. Harris, Powell, OH (US)

(73) Assignee: Harris Instrument Corporation, Delaware, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/656,601

(22) Filed: Sep. 7, 2000

Related U.S. Application Data

(63) Continuation of application No. 09/260,955, filed on Mar. 2, 1999, now Pat. No. 6,196,068, which is a continuation of application No. 08/934,984, filed on Sep. 22, 1997, now Pat. No. 5,911,161, which is a continuation of application No. 08/651,965, filed on May 21, 1996, now Pat. No. 5,821,423, which is a continuation of application No. 08/301,352, filed on Sep. 6, 1994, now Pat. No. 5,546,808.

(51) Int. Cl.[7] .................................................. G01N 21/00
(52) U.S. Cl. ............................. 73/618; 73/599; 356/381
(58) Field of Search ........................... 73/599, 618, 624; 356/381, 383

(56) References Cited

U.S. PATENT DOCUMENTS

| 3,448,278 | 6/1969 | O'Brien et al. ...................... 250/219 |
| 3,567,320 | 3/1971 | Chitayat .................................... 356/4 |
| 3,574,411 | 4/1971 | Miller ..................................... 302/49 |
| 3,653,770 | 4/1972 | Yamamuro ........................... 356/160 |
| 3,724,958 | 4/1973 | Callan ................................... 356/160 |
| 3,739,177 | 6/1973 | Ko ......................................... 250/206 |
| 3,781,115 | 12/1973 | Rader et al. ......................... 356/167 |
| 3,856,411 | 12/1974 | Zanoni ................................. 356/167 |
| 3,856,412 | 12/1974 | Zanoni ................................. 356/167 |
| 4,088,411 | 5/1978 | Ahlquist et al. ..................... 356/167 |
| 4,123,169 | 10/1978 | Meriläinen et al. ................. 356/167 |
| 4,223,388 | 9/1980 | Nishikawa et al. .................. 364/521 |
| 4,298,807 | 11/1981 | Favre .................................... 250/562 |
| 4,300,836 | 11/1981 | Holmes et al. ...................... 356/376 |
| 4,329,876 | 5/1982 | Chen et al. ............................ 73/618 |
| 4,348,656 | 9/1982 | Gorgone et al. ............. 340/146.3 R |
| 4,360,274 | 11/1982 | Norton-Wayne ..................... 356/394 |
| 4,427,295 | 1/1984 | Nishiyama ........................... 356/371 |
| 4,435,834 | 3/1984 | Pauli et al. ............................... 382/7 |
| 4,456,982 | 6/1984 | Tournois ................................. 367/11 |
| 4,461,576 | 7/1984 | King ..................................... 356/375 |
| 4,464,786 | 8/1984 | Nishito et al. ........................... 382/7 |
| 4,465,937 | 8/1984 | Forbes .................................. 250/560 |
| 4,479,049 | 10/1984 | Hirose .................................. 235/379 |
| 4,499,383 | 2/1985 | Loose ................................... 250/561 |
| 4,517,845 | * 5/1985 | Ransheim et al. ................ 73/861.05 |
| 4,521,112 | 6/1985 | Kuwabara et al ................... 356/375 |
| 4,521,113 | 6/1985 | Kuwabara et al. .................. 356/387 |
| 4,555,633 | 11/1985 | Björkelund .......................... 250/560 |
| 4,559,451 | 12/1985 | Curl ...................................... 250/560 |
| 4,559,452 | 12/1985 | Igaki et al. ........................... 250/560 |
| 4,578,998 | * 4/1986 | Gard ........................................ 73/73 |
| 4,648,718 | 3/1987 | Sadamitsu et al. .................. 356/387 |
| 4,674,325 | * 6/1987 | Kiyobe et al. ........................... 73/73 |
| 4,679,941 | 7/1987 | Fujita .................................... 356/384 |

(List continued on next page.)

FOREIGN PATENT DOCUMENTS

| 2 612 629 | 3/1987 | (FR) . |
| WO 92/17857 | 3/1992 | (WO) . |

Primary Examiner—Max Noori
(74) Attorney, Agent, or Firm—Standley & Gilcrest LLP (57) ABSTRACT

An apparatus and method are disclosed wherein a linear array of electromagnetic radiation emitting devices are arranged in association with a moving workpiece. Electromagnetic radiation emitted by the array is received by two or more receivers. Several non-contact measurements may be obtained on a workpiece using the present apparatus and methods.

2 Claims, 9 Drawing Sheets

U.S. PATENT DOCUMENTS

| | | | |
|---|---|---|---|
| 4,680,806 | 7/1987 | Bolza-Schünemann | 382/65 |
| 4,815,043 * | 3/1989 | Shirasaka | 367/7 |
| 4,823,393 | 4/1989 | Kawakami | 382/7 |
| 4,827,436 | 5/1989 | Sabersky et al. | 364/559 |
| 4,850,232 | 7/1989 | Markis | 73/865.8 |
| 5,006,719 | 4/1991 | Blaser | 250/560 |
| 5,107,131 | 4/1992 | Okada et al. | 250/560 |
| 5,163,319 | 11/1992 | Spies et al. | 73/146 |
| 5,220,177 | 6/1993 | Harris | 250/548 |
| 5,227,985 | 7/1993 | DeMenthon | 364/559 |
| 5,469,262 | 11/1995 | Keen et al. | 356/386 |
| 5,490,728 | 2/1996 | Schietinger et al. | 374/7 |
| 5,546,808 * | 8/1996 | Harris | 73/618 |
| 5,821,423 * | 10/1998 | Harris | 73/618 |
| 5,911,161 * | 6/1999 | Harris | 73/618 |

\* cited by examiner

APPARATUS AND METHOD FOR BINOCULAR MEASUREMENT SYSTEM

This application is a continuation of application Ser. No. 09/260,955, filed Mar. 2, 1999, now U.S. Pat. No. 6,196,068, which is a continuation of application Ser. No. 08/934,984, filed Sep. 22, 1997, now U.S. Pat. No. 5,911,161. U.S. Pat. No. 5,911,161 is a continuation of application Ser. No. 08/651,965, filed May 21, 1996, now U.S. Pat. No. 5,821,423. U.S. Pat. No. 5,821,423 is a continuation of application Ser. No. 08/301,352, filed Sep. 6, 1994, now U.S. Pat. No. 5,546,808. All of these applications are incorporated herein by reference.

BACKGROUND AND SUMMARY OF THE INVENTION

The present invention relates generally to measurement systems, and more particularly, to non-contact measuring of rolled, calendared, woven, extruded, and other sheet and web products. The invention incorporates an electromagnetic radiation emitter, an electromagnetic radiation receiver, and a measurement processing unit.

There are many situations in industrial process control where the continuous, accurate measurement of product width, thickness, or edge position can improve the quality and efficiency of the production process. There are only a few known methods for making some of these measurements. For example, in the primary metals industry, the most common methods involve the use of charge coupled device (CCD) television cameras with elaborate mounting devices and expensive computer support systems. Other methods involve mechanically scanned laser beams and mechanically positioned opto-electronic devices. The mechanically positioned devices generally require frequent maintenance in the industrial environment while the scanned laser devices also have moving parts that wear out and require unscheduled down time or scheduled periodic maintenance.

In the CCD camera systems, a small change in the position of the camera is multiplied by the magnification of the lens in such systems. If the lens is focusing the view of a 40 inch wide strip, for example, on to a 1 inch long array, a change in the position of the camera of a few thousands of an inch is multiplied by a factor of 40 as the image position shifts on the array. The thermal growth in the lengthy of mounting fixture support arms must be compensated for if accurate position measurements are to be made with such a system. Thus, the elaborate fixtures that are required for such systems, and the installation and computer support needed, often make the cost of CCD camera systems prohibitive.

Materials undergoing industrial production processes vary widely in physical makeup, such as extruded plastics or steel billets. Speed of movement of these materials as they are being processed also varies widely. Some processes may move a work piece at a very slow rate of speed while other processes may move a work piece at speeds of upwards to 90 mph. Some materials will also reach extremely high temperature. This must be taken into consideration where measurement devices could potentially be destroyed by such temperatures.

One measurement system which has found substantial acceptance in industry is marketed under the trademark "SCAN-A-LINE®". The SCAN-A-LINE® measurement system employs a linear array of electromagnetic radiation emitting diodes positioned on one side of a material, such as a web or sheet moving within a production process. The diodes of the array are illuminated in a scanning sequence having a stable time base for example, at a 20 KHZ rate developed by a quartz crystal oscillator. Positioned above the moving material under production and opposite the associated diode array, is a tuned photoresponsive receiver which reacts to the illumination emanating from the diodes which are unblocked or partially blocked from view by the receiver by the moving material. Associated controls connected to the receiver are called upon to extrapolate the electromagnetic radiation signals to develop measurement information concerning the material. The extrapolation is based upon the observation that each LED in the emitting array produces a cone of electromagnetic radiation, and the electromagnetic radiation cones from adjacent LEDs overlap in the electromagnetic radiation path to the receiver. An edge of the product being measured blocking the electromagnetic radiation path from the emitting diodes to the receiver will attenuate the electromagnetic radiation from more than one diode. The extrapolating process takes samples of the amplitude of the electromagnetic radiation received in sequence from the partially blocked and unblocked LEDs, and develops a time-based stair step electromagnetic radiation output pattern representing scan across the edge. The edge position of the material being observed may then be defined as the time equivalent point on the smooth curve signal where the voltage drops to one-half of the peak LED signal amplitude. The SCAN-A-LINE® system is marketed by Harris Instrument Corporation of Columbus, Ohio.

The SCAN-A-LINE® system was first patented in U.S. Pat. No. 5,220,177, which issued on Jun. 15, 1993. The patent described a system wherein each electromagnetic radiation emitting device of the array utilized is energized by a unique drive current which is preselected to cause the emission of electromagnetic radiation exhibiting substantially uniform intensity at the receiver when there is no attenuation of the electromagnetic radiation by a material under edge evaluation. Such balancing or optimization of the array electromagnetic radiation output not only achieves importantly enhanced system accuracy in carrying out edge location, but also substantially expands the range of application for such non-contacting measurement techniques. In this regard, the edge locating technique can be employed with transparent or semi-transparent materials. When so employed, the time based trigger signal from which edge data is developed in generated at a location in scan time between a transition of detected amplitudes representing a maximum value and a minimum value. System accuracy is substantially improved through the utilization of a receiving photodetector assembly having a lengthwise dimension which is expanded. With the combination of this improved receiving approach and the balanced electromagnetic radiation values at the receiver, system performance has been observed to be improved beyond what would have been expected.

Many of today's industrial measurement applications require measurement of width or position of a product having an unstable passline. Measurement of the instability of passlines has gained in importance. Furthermore, measurement of the width of a material work piece and the thickness of the workpiece are of significant importance in today's industrial process applications. Through the employment of semiconductor device based arrays emitting in the infrared region of the electromagnetic spectrum in conjunction with silicone photocell receiver components, substantially expanded stand-off distances and spacing between the receivers and emitter, are available. Enhanced spacing permits improved edge detection of hot materials such as steel billets. The improved ray trace geometry achieved with enhanced emitter-to-receiver spacing achieves enhanced edge location accuracy at the passline where vertical movement of the material may be encountered. Ray trace geometry further permits an advantageous lower outside edge detection where the edges of relatively thick material forms such, as billets of steel, are monitored.

With the apparatus of the present invention, multiple receivers may be employed with one or more emitters. The receivers may be removed to locations directly over each end of a strip emitter. This arrangement helps to eliminate passline errors. In the present invention, preferably two receivers are used for each emitter and each receiver is located over one of the opposite ends of the emitter. In this manner, a signal can be developed that represents passline height. The passline height signal can effectively be used to correct width measurements for height changes. Thus, the present invention is a system of binocular vision measurement.

By scanning the electromagnetic radiation emitted from an array in a controlled sequence, with a workpiece positioned between the electromagnetic radiation emitting source and at least two receivers, several important measurements can be made concerning the workpiece, as the workpiece moves through a production process. In accordance with the present invention, an array of spaced discrete electromagnetic radiation emitting devices are disposed generally along an array axis. Each electromagnetic radiation emitting device is responsive to the application of a drive current thereto to emit electromagnetic radiation. The electromagnetic radiation array is positioned a select distance from one side of a material workpiece and is located to extend outwardly from at least one edge of the workpiece. At least two photoresponsive receivers are positioned at a predetermined stand-off distance from the material workpiece, in electromagnetic radiation receiving relationship with the array, and oriented so as to position a photodetector axis in substantially parallel relationship with the array axis as each electromagnetic radiation emitting device is discretely energized in a sequence by the application of drive current at a predetermined system frequency. The photodetectors detect the electromagnetic radiation emitted by the electromagnetic radiation emitting devices which are either partially attenuated or nonattenuated by the material workpiece. From the electromagnetic radiation detection, the present invention enables the derivation of output signals at the system frequency which exhibits amplitude data. By correlating the amplitude data with time and space location data, to derive a signal representing a desired measurement concerning the material workpiece.

The present invention comprises the apparatus and method possessing the construction combination of elements, arrangement of parts and steps which are exemplified in the following drawings and detailed description.

DETAILED DESCRIPTION OF PREFERRED EMBODIMENT(S)

Figure 1:
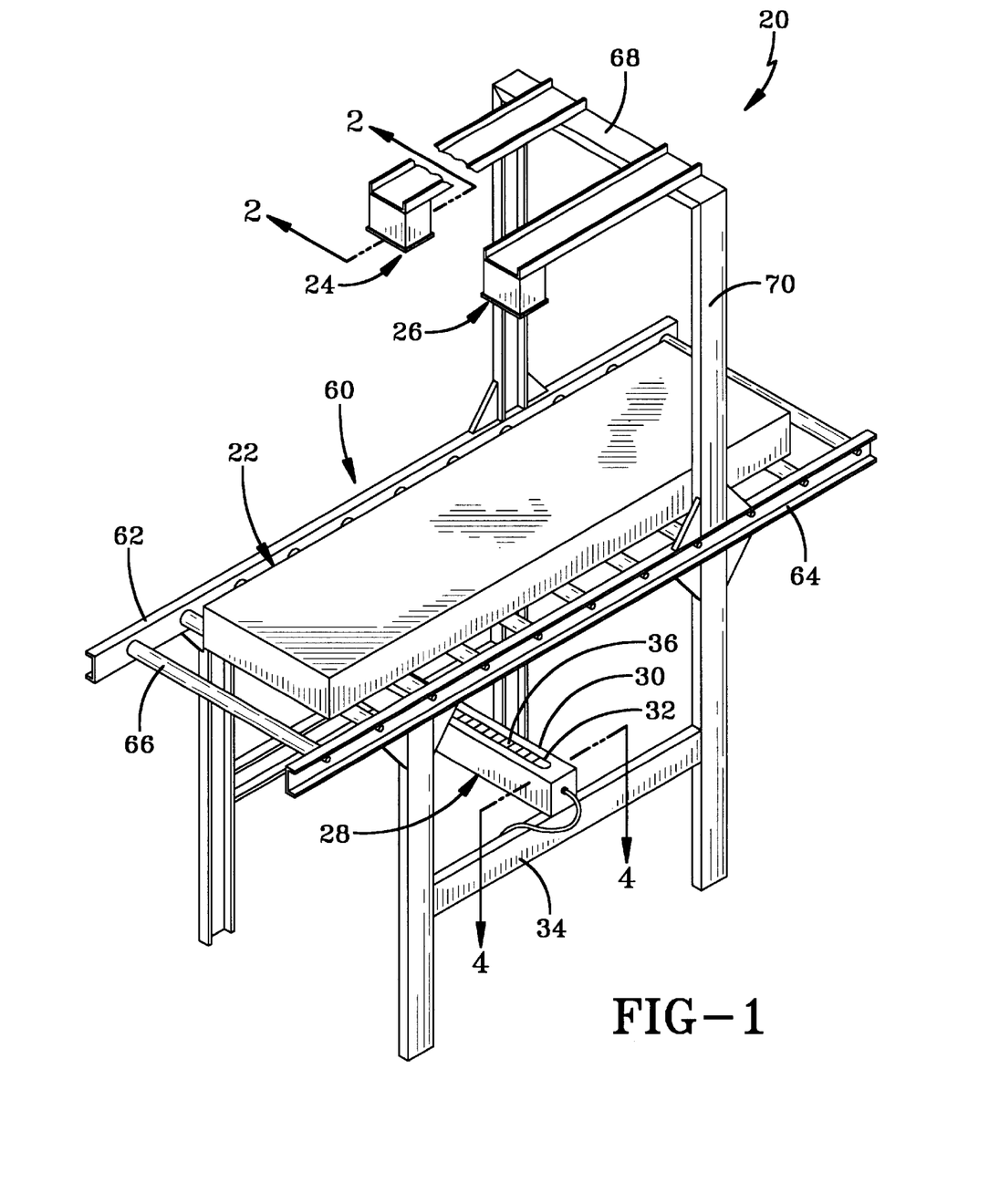
FIG. 1 is a partial perspective view of one embodiment of an apparatus of the present invention employed to measure a sheet of material.

Referring now the drawings, and particularly FIG. 1, the apparatus of the present invention is represented at 20. For example purposes only, and not to be construed as limiting, the apparatus 20 is shown installed in a steel manufacturing facility wherein steel billets at very high temperatures are within a process wherein they are guided along a conveyor line. Each outside edge of a billet 22 is monitored by two receivers 24 and 26. The billet 22 is shown as it moves along a conveyor 60 having side supports 62 and 64, which support a plurality of conveyor rollers 66.

With the exception of a right-left reversal, the first receiver 24 is preferably identical to the second receiver 26. The apparatus 20 also includes an emitter 28 which comprises a housing 30 within which are supported a linear array of discrete electromagnetic radiation sources configured to emit electromagnetic radiation preferably in the infrared region of the electromagnetic spectrum. The electromagnetic radiation emission may be transmitted through a planar lens mounted within a slit or elongate opening 32. The housing 30 is preferably mounted so as to position the slit 32 transversely to the direction of travel of the billet 22 and at a location such that it extends from a location underneath the bottom surface of the billet 22 to a location positioned outwardly from the bottom surface of the billet. A mounting member 34 may be arranged to extend across the side supports 62, 64 to facilitate the securement of the housing 30. In one embodiment of the present invention, the emitter 28 is located below the bottom surface of the billet 22. However, in other arrangements of the present invention, the emitter 28 may be located either substantially directly adjacent the bottom surface of the billet or workpiece 22 or at varying distances away therefrom.

The first and second receivers 24, 26 are preferably mounted along a brace 68 that is supported by a post 70. The stand-off distance or distance between the receivers 24, 26 and the conveyor 60 is preferably greater than the distance from the conveyor to the emitter housing 30. A passline is defined in the present invention as the plane through which electromagnetic radiation from the slit 32 impinges upon the bottom surface of the workpiece 22 and is seen as it extends beyond the outside edge thereof by one or more of the receivers. The receivers are thus well away from possible destructive effects, such as heat, from the workpiece 22.

The array of electromagnetic radiation emitting devices incorporated within the emitter 28 will vary in length depending upon the application at hand. The accuracy of measurement achieved with the present invention is enhanced as the density or number of electromagnetic radiation emitting devices per unit length of emitter 28 is increased. The spacing between each electromagnetic radiation emitting device 36 of emitter 28 is preferably the same between each device 36. In one embodiment of the present invention a 0.1 inch center-to-center spacing between emitting devices 36 is provided. The electromagnetic radiation emitting devices 36 are preferably individually sequentially energized to emit electromagnetic radiation in a predetermined scanning frequency. In one embodiment of the present invention, one-half cycle of a 20 KHz clock or scanning frequency is incorporated. When the last device in such an array has been energized and then cutoff, a reset signal is generated to begin the sequence again at the first device 36 of the array 28. The reset signal may be referred to as the "Sync Pulse". As the individual devices 36 of the array 28 are energized in scanning fashion and the electromagnetic radiation emitted progresses from a non-attenuated outside region or edge of the material being measured such as billet or workpiece 22, a variation of the peak intensity of the emitted radiation for this scan region will be witnessed at the associated receivers 24, 26. This variation in attenuation results in the generation of a stair step form of waveform which is preferably processed by low pass filtering to achieve a smooth curve. The midpoint of this curve is preferably detected to evolve a time based trigger pulse which may be employed by read out or control systems to determine the location of an outside edge or the width of opposite edges of the workpiece 22.

Figure 2:
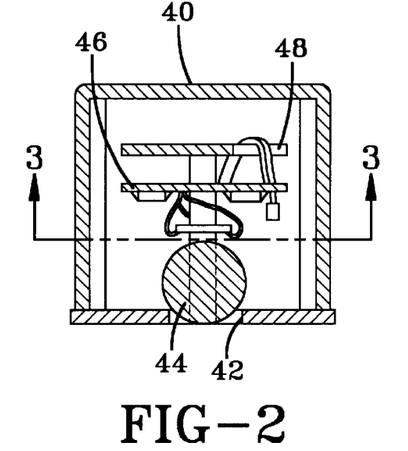
FIG. 2 is a sectional view taken along line 2—2 of FIG. 1.
Figure 3:
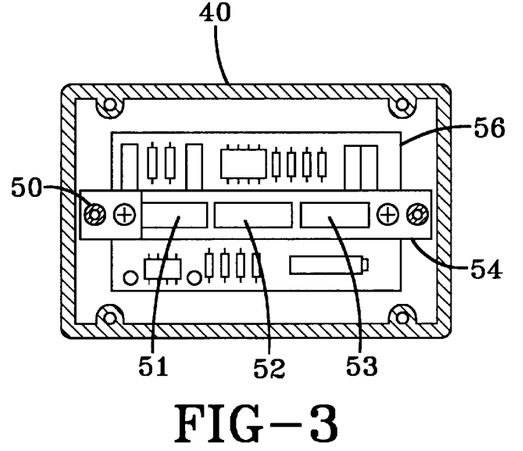
FIG. 3 is a sectional view taken along line 3—3 of FIG. 2.

Referring to FIGS. 2 and 3, internal structure of the receiver preferably includes a housing 40 having an opening therein at 42. The opening 42 is preferably aligned in parallel with the corresponding slit 32 of the emitter 28 as seen in FIG. 1. A cylindrical gathering lens 44 is placed in association with the opening 42. Above the tens 44, a circuit board 46 and a shield 48 are secured within the housing 40. A support board 50 is seen in FIG. 3 and preferably supports three rectangular silicon solar cells 51, 52, 53 in a linear array. The solar cells are preferably coupled in parallel. Each of the solar cells, in this example, has a lengthwise extent of 2 centimeters and, thus, coupled in a grouping of three in the linear array as shown, the length of the photoresponsive components amounts to approximately 6 centimeters. A filter 54 may be positioned over the entrances to these devices which confronts all electromagnetic radiation impinging thereon and passes only electromagnetic radiation or infrared radiation within a selected region of the electromagnetic spectrum.

Figure 4:
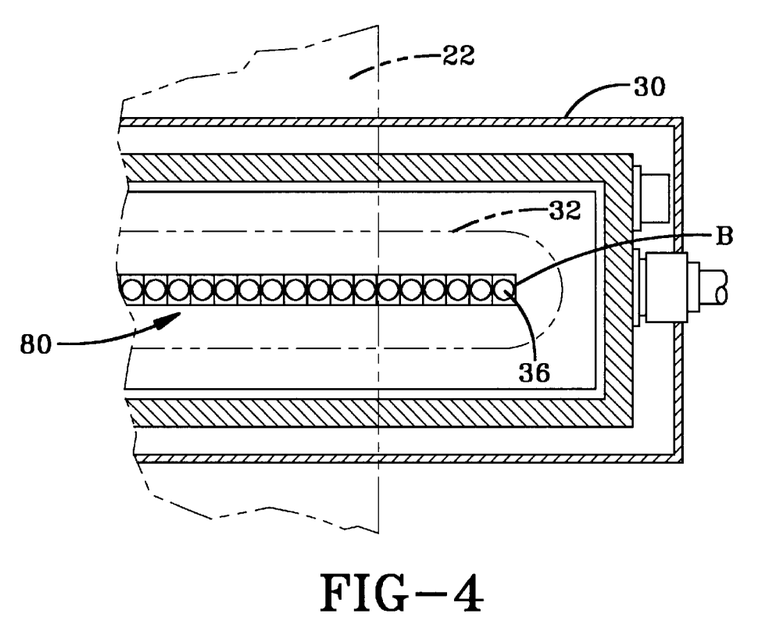
FIG. 4 is a sectional view taken along line 4—4 of FIG. 1.

Referring now to FIG. 4, the array of electromagnetic radiation emitting devices 36 are represented generally at 80 behind the slit 32. Within the array 80, the scanning sequence may progress with the first of the devices in the row. Complete emitters, receivers and associated hardware may be purchased from Harris Instrument Corporation in Columbus, Ohio.

Figure 5:
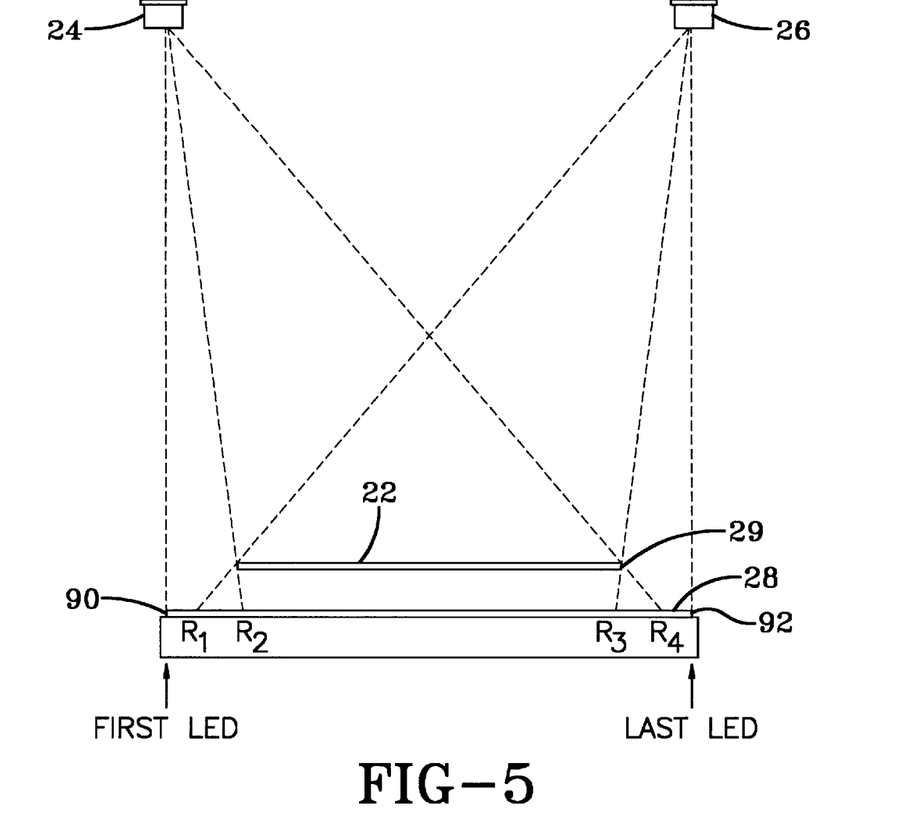
FIG. 5 is diagrammatic view of an embodiment of the present invention having a single emitter in association with two spaced-apart receivers.

Referring now to FIG. 5, an arrangement of the apparatus of the present invention is shown in which a workpiece 22 is shown in spaced relationship apart from emitter 28. Positioned directly above a first edge 90 of said emitter 28 is the first receiver 24. Positioned directly over a second edge 92 or the emitter 28 is a second receiver 26. Electromagnetic radiation visible to receiver 26 at location R1 along the array 28, is the last diode to be visible by receiver 26 in a left to right scan direction, before the next diodes are blocked from view of receiver 26 by the workpiece 22. Location R2 along the array is the last diode to be seen by receiver 24 before additional diodes are blocked from view by the workpiece. At an opposite end 29 of the workpiece, the diodes will once again become visible at location R3, to receiver 26. At location R4 along the array the diodes will once again become visible to receiver 24.

Figure 6:
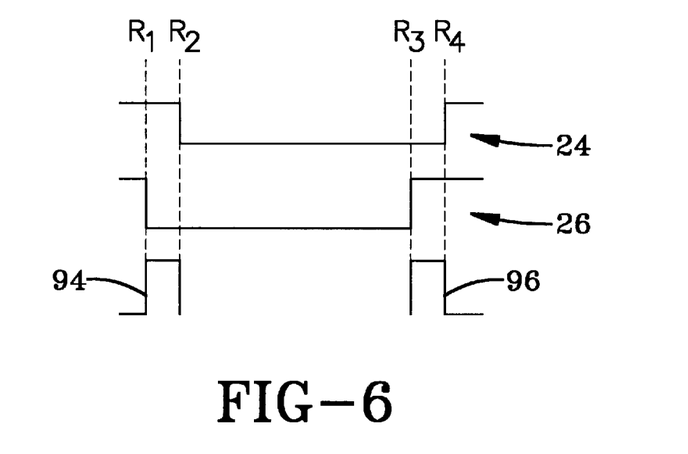
FIG. 6 is a video timing diagram of the embodiment shown in FIG. 5.
Figure 7:
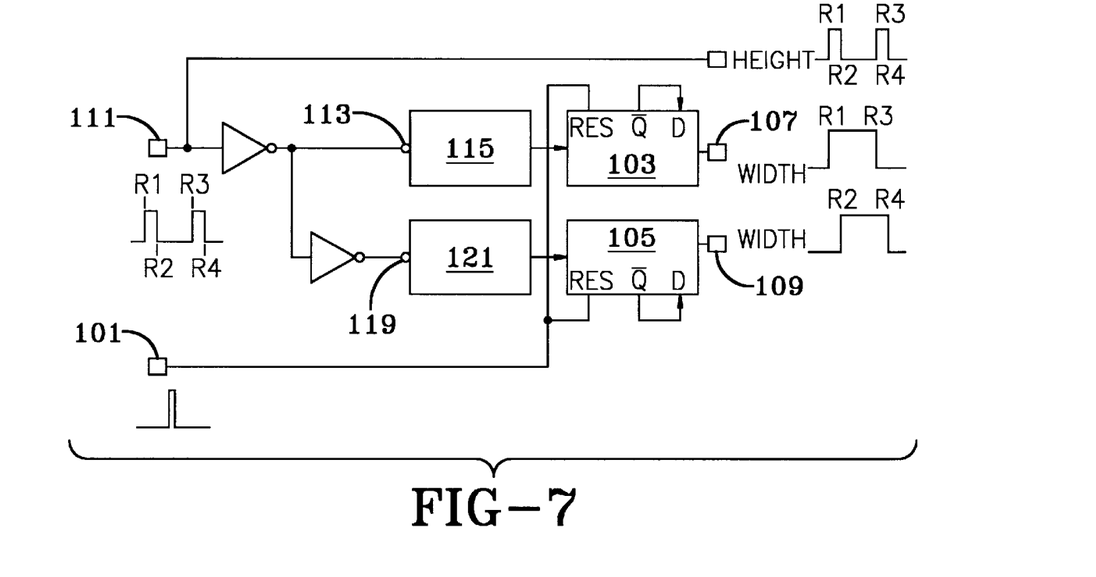
FIG. 7 is a diagrammatic view of a video decoder for use in an embodiment of the present invention.

Referring to FIG. 6, the graph shows the transmitted electromagnetic radiation video that begins at point R1 with receiver 26 and ends at point R4 with receiver 24. The spaces 94, 96 under the video plot in FIG. 6 represent the time between electromagnetic radiation emitted diode sightings at receiver 26 and receiver 24 and is directly proportional to the height of the workpiece edges above the emitter. The time during which the receivers produce different video signals can be used to measure height. The video signal from each receiver is compared with the video signal from the other receiver using an exclusive OR (XOR) logic circuit. This produces a logic one digital signal anytime one receiver can see the array while the other receiver cannot. A single XOR'ed video signal can be used to bring video information from both receivers to the measurement processing unit over one transmission line. A simple flip-flop circuit, such as illustrated in FIG. 7, can be used to separate the video signal back into its original components, such as illustrated in FIG. 6. The conversion may be bi-passed when height measurements are required. The signal processor may be used to alternately select width or height as required. Anytime one receiver can see the array while the other receiver cannot, a logic 1 signal is produced. This is electronically accomplished with an exclusive OR logic circuit, for example, a CMOS 4030 IC. By processing the workpiece edge (zenith reference to the first edge encountered by the scanning LED emitters) height above the array separately from the workpiece opposite edge height (with reference to the second edge encountered by the scanning LED emitters) above the array, the tilt of the workpiece may be obtained when it is not in a plane parallel to the plane containing the emitter scan path. The average height that the workpiece is above the emitter may be obtained by determining the length between R2 and R1 and adding that value to the length between R4 and R3, then taking that sum and dividing it by 2. A video decoder arrangement for accomplishing this computation is shown in FIG. 7.

FIG. 7 illustrates a block diagram of the circuit for separating the combined exclusive OR (XOR'ed) video signal back into the two original video signals from Receiver A and B. The system Sync Pulse that signals the end of one scan and the beginning of the next, is connected at point 101 of the Video Decoder circuit. This positive pulse is applied to the RESET inputs of two sections 103, 105 of a CMOS 4013 flip-flop that are wired as bi-stable multivibrators. The Sync Pulse causes both flip-flops to be reset, with the Q outputs at points 107 and 109 set to the logic 0 state.

At the input terminal 111, the XOR'ed video signal is connected to a series of two buffer inverter sections of a 4049 CMOS integrated circuit. Each time the signal passes through a buffer/inverter stage the logic polarity of the signal is inverted. The time T1 in the XOR'd video waveform represents a positive transition. At point 113 in the circuit, this transition is inverted to negative, and therefore causes the first negative triggered one-shot multivibrator circuit 115 (NE558 Integrated Circuit) to produce a brief positive pulse at point 117. This short (approximately 1 microsecond) pulse is connected to the clock input of the first flip-flop where it will cause the Q output at point 107 to change to the logic 1 state. At time T3 the inverted input waveform will again produce a negative transition at point 113. The resulting one-shot pulse will again cause a state change in the first flip-flop, returning the Q output at point 107 to logic 0. The waveform produced at point 107 is identical to the original video signal from Receiver 26 as illustrated in FIG. 6.

The second one-shot input at point 119 will have a positive transition at times T1 and T3 because of the second buffer/inverter stage in series with it. Because it is negative triggered, however, the second one-shot multivibrator 121 will not produce an output pulse until T2 and again at T4. The waveform produced by the second flip-flop Q output at point 109 is identical to the original video signal from receiver 24 in FIG. 6.

Figure 8:
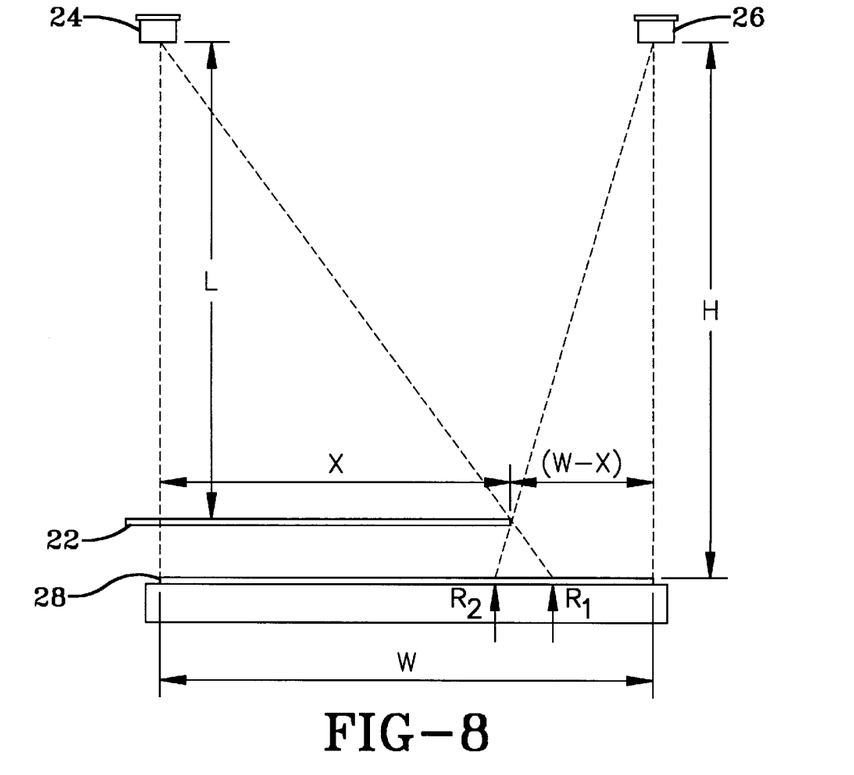
FIG. 8 is a diagrammatic view of an arrangement of the apparatus of the present invention for use with a single edge position formula.

Referring now to FIG. 8, a single edge position formula may be used in association with data collected from the apparatus of the present invention. In this embodiment, x represents the distance along the workpiece 22 from a far right end of the workpiece to a point on a line extending directly below receiver 24 forming a 90° angle with the workpiece. The distance from the receiver to the workpiece is designated by the letter L. The distance from receiver 26 to the emitter 23 is designated by the letter H. The width of the electromagnetic radiation emitting diode scan is designated by the letter W. Point R1 along the emitter is the first location in which electromagnetic radiation is visible to receiver 24 in a left to right scan direction. Location P, at the emitter, is the first location at which electromagnetic radiation is visible to receiver 26. The following formulas may then be invoked:

1) $X/L = R1/H,$  $\quad X = (L/H)R1$

2) $(W-X)/L = (W-R2)/H,$  $\quad L = \left[\frac{(W-X)(H)}{W-R2}\right]$

SUBSTITUTE EXPRESSION FOR L IN FORMULA 1.

$$X = \left[\frac{(W-X)(H)}{(H)(W-R2)}\right][R1] \text{ WHICH SIMPLIFIES TO}$$

$$W(X) - R2(X) = (W)R1 - (X)R1$$

$$X(W - R2 + R1) = W(R1)$$

$$X = \left[\frac{W}{W+(R1-R2)}\right][R1]$$

$\left[\frac{W}{W+(R1-R2)}\right]$ IS A GAIN FACTOR TO MULTIPLY

SCAN-A-LINE® READINGS BY TO LOCATE X INDEPENDENT

OF PASSLINE L.

Figure 9:
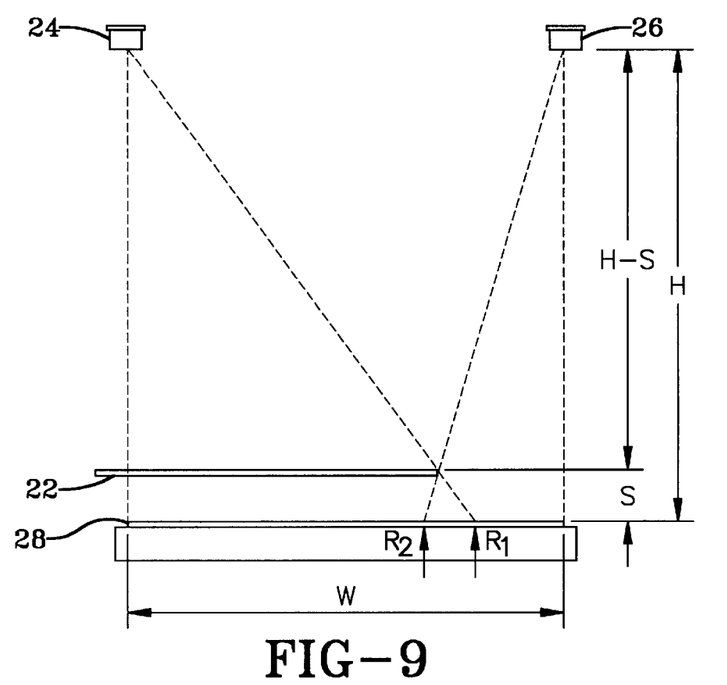
FIG. 9 is a diagrammatic view of an arrangement of the apparatus of the present invention for use with a workpiece height formula.

Referring to FIG. 9, the height S at which the workpiece is positioned above the emitter may be computed. In this Figure the locations R1 and R2 are the same as defined in FIG. 8. The distances H and W also remain the same. The following formulas would then apply:

BY SIMILAR TRIANGLES:

$$\frac{W}{R1-R2} = \frac{H-S}{S}, S(W) = (H-S)(R1-R2),$$

$$S(W) + S(RT - R2) = H(R1 - R2),$$

$$S[W + (R1 - R2)] = H(R1 - R2),$$

$$S = \frac{H(R1-R2)}{W+(R1-R2)}$$

Figure 10:
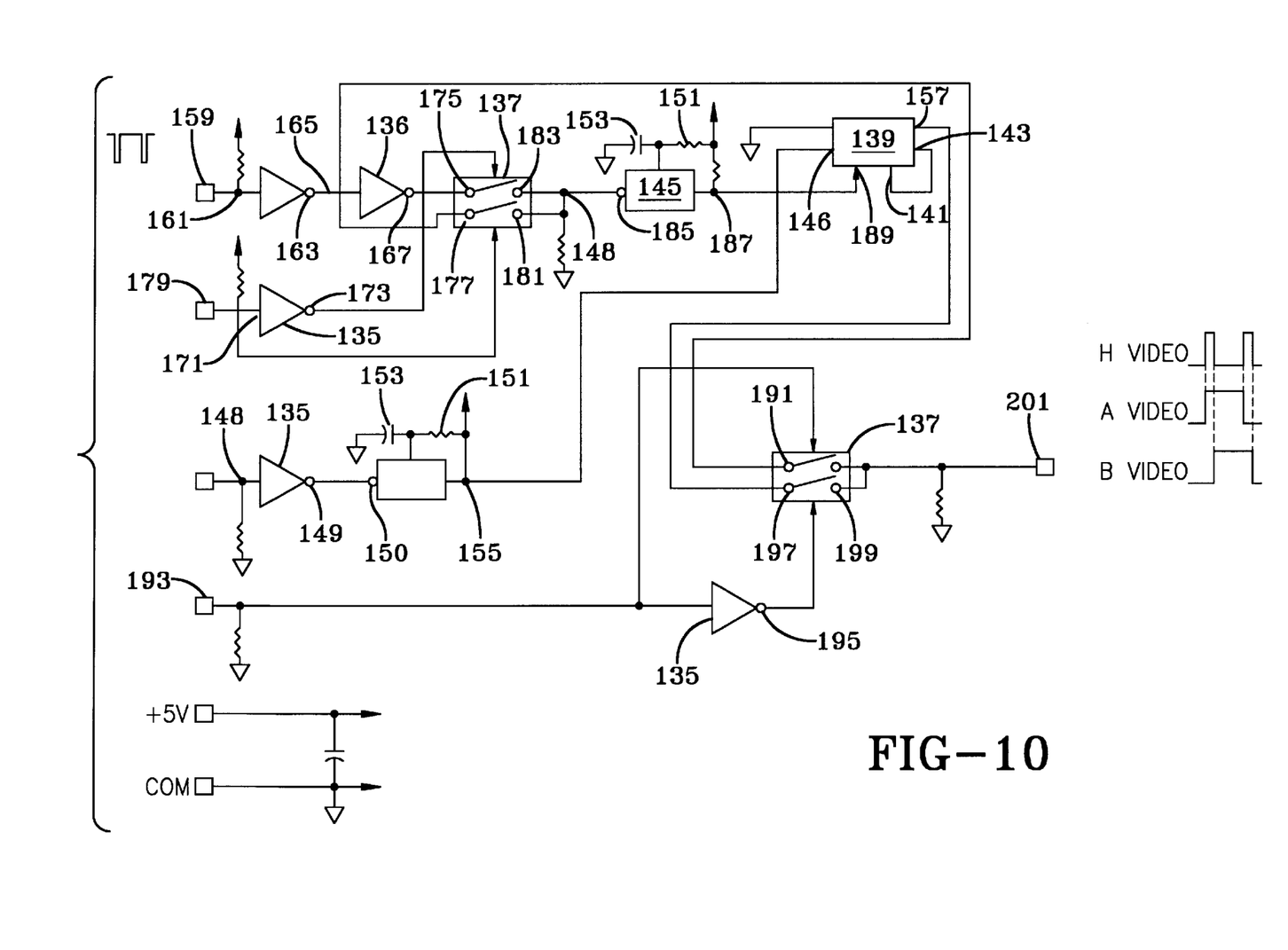
FIG. 10 is an electrical schematic diagram of an embodiment of a video pre-processor of the present invention.
Figure 12:
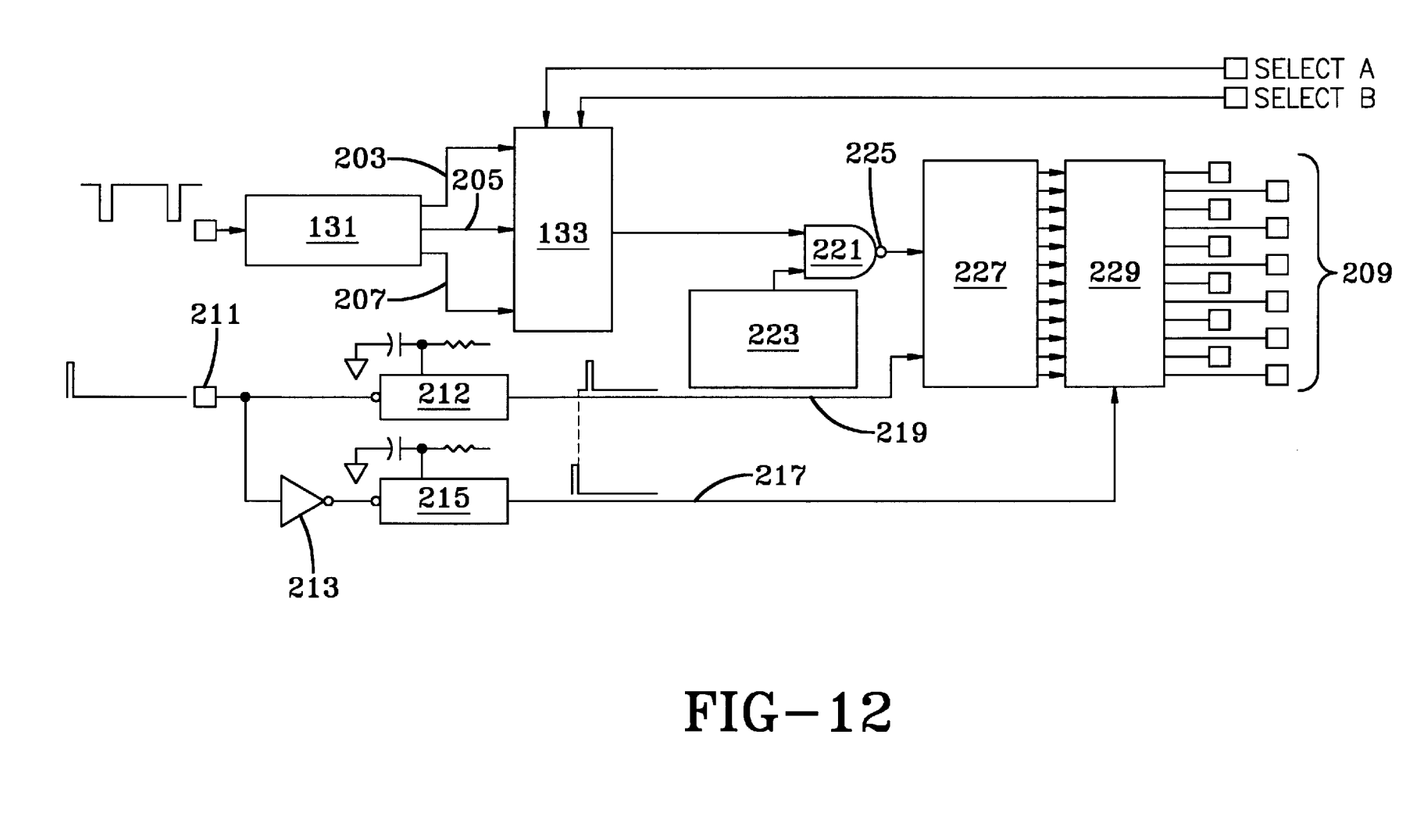
FIG. 12 is a schematic block diagram of video processing of the present invention with parallel port data output.

Referring now to FIG. 10, an electrical schematic of one embodiment of a processor of the present invention is shown. The circuit illustrated in FIG. 10, represents the circuit blocks labeled Video Pre-processor 131 and Video Select Switch 133 in FIG. 12. The circuits in FIGS. 10 and 12 are used to connect a binocular SCAN-A-LINE® sensor to older SCAN-A-LINE® measurement processing systems. If there is significant movement of the product being measured during the time of three scans, the measurement data taken will be inaccurate. The circuit is still useful in that it provides compatibility with older equipment.

The IC's labeled 135 are CMOS buffer/inverter sections from a 4049 integrated circuit. They are used to invert the logic state of digital signals in the circuit.

The IC's labeled 137 are CMOS 4066 analog switches. These are used to select input and output signals. A logic 1 at the control input electrically connects the CMOS switch input and output.

The 4013 CMOS integrated circuit 139 is a bi-stable multivibrator (flip-flop). A positive transition at the clock input transfers the logic signal at the D input 141 to the Q output 143.

The NE558 at 145 is a negative triggered one-shot multivibrator. When a negative going transition is sensed at the input, the NE558 produces a pulse at the output. The length of the output pulse is determined by the resistor and capacitor at the timing input of the circuit.

The Sync Pulse that signals the end of one scan and the beginning of another is connected to a 4049 inverter at node 148. The inverted Sync Pulse at node 149 of the 4049 is connected to node 150, the input of the NE558 where it triggers the one-shot multivibrator to produce a positive output pulse slightly longer than the Sync Pulse. The length of the pulse produced is determined by the 4.7 k resistor 151 and the 0.1 uF capacitor 153. This pulse from node 155 of the NE558 is connected to the RESET input of the 4013 flip-flop at node 146. The RESET input pulse causes the Q output at node 157 to go to logic 0 at the end of each scan.

The VIDEO IN signal 159 is the XOR video signal from FIG. 6. It represents a composite of the video signals from Receiver 24 and Receiver 26. The VIDEO IN signal is inverted in the 4049from node 161 to node 163. It is again inverted in the 4049 at 136 from node 165 to node 167. The signal at node 167 has the same logic polarity as the VIDEO IN signal and is connected to node 175, one input of a 4066 CMOS switch. The signal at node 165 is the inverted logic state of VIDEO IN 159 and is connected to node 177, the input of another 4066 CMOS switch. When the A/B select input signal 179 is at logic 1, node 177, the control input of the 4066 is connected via the CMOS switch to node 181.

Because the logic is inverted from node 171 to node 173 of the 4049, node 13 of the 4066 is at logic 0 and node 175 is not connected to node 183 via the CMOS switch. In this state the inverted VIDEO IN signal is connected via the CMOS switch to the node 185 input of the NE558 one-shot 145. Every time the VIDEO IN signal transitions from logic 0 to logic 1 a pulse is produced by the NE558 at node 187.

The pulse output from node 187 of the NE558 is connected to the clock input of the 4013 at node 189. Each time a clock pulse transitions to logic 1, the 4013 Q output at node 157 changes state. In the A selected mode, the output of the 4013 flip-flop 139 at node 157 is the Video A signal.

If the A/B input 179 is switched to logic 0, the non-inverted VIDEO IN 159 signal would be sent to the NE558 via the 4066 CMOS switch nodes 175 and 183. The NE558 at 145 would not produce pulses at the opposite transition times causing the 4013 output at node 157 to be the Video B signal.

The Video A or Video B signal from node 157 of the 4013 flip-flop is connected in node 191 of a 4066 CMOS switch. If the H/W (height or width) select input 193 is at logic 1, the Video A or Video B width signal from the 4013 node 157 is connected to the Video Out 201 via a 4049 buffer/inverter node 195. If a logic 0 signal is connected to the H/W input, the XOR video and VIDEO IN 159 is connected to the Video Out 201 through the 4066 node 197 and node 199.

Figure 11:
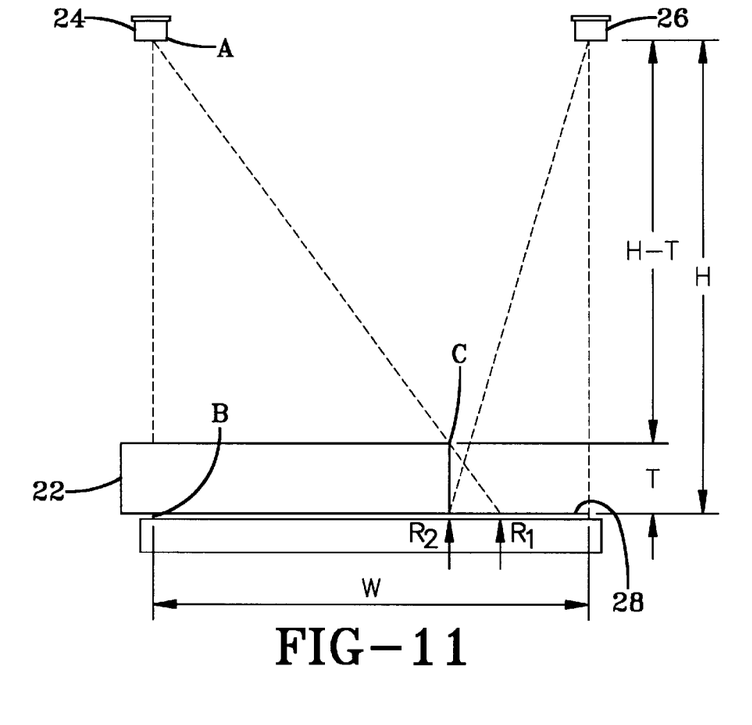
FIG. 11 is a diagrammatic view of an arrangement of the apparatus of the present invention for use with a workpiece thickness formula where the workpiece is located directly at the electromagnetic radiation source.

Referring now to FIG. 11, a workpiece of a certain thickness is conveyed over an emitter 28. In this arrangement of the present invention the letter T is representative of the thickness of the workpiece. The location R1 is of the same definition as supplied in previous figures, while location R2 is electromagnetic radiation different in this arrangement. Due to the fact that the workpiece has substantial thickness the receiver 26 is blocked from receiving electromagnetic radiation from the emitter to a greater extent than with a thinner workpiece. Otherwise, R2 remains the first location at which electromagnetic radiation is received by receiver 26 in a left to right scan direction. Also shown in FIG. 11 are locations A, B, and C. Location A is the center of receiver 24. Location B is the first edge 90 of emitter 28 and location C is the upper, right corner of the workpiece. The following formulas would apply to compute the thickness of the workpiece:

BY SIMILAR TRIANGLES: A, B, R1=C, R2, R1

$$\frac{T}{H} = \frac{R1 - R2}{R1}$$

SOLVING FOR THICKNESS T $$T = H\left[\frac{R1 - R2}{R2}\right]$$

The measured width of a workpiece can be taken from either receivers' view of the array. With compensation for the height of the workpiece as described above, the measured width of the workpiece is proportional to the time during which receiver 24 cannot see the array. The measured width is also proportional to the time during which receiver 26 cannot see the array. The most accurate width measurement can be made by averaging the measurements as seen by both receivers. In addition to better average, this method can be used to compensate for the workpiece being in a non-parallel plane. If the plane of the workpiece is tipped at an angle to the plane of the emitter array, one receiver will see the width as wider than it is, while the other will see a narrower width than normal. The average of these two measurements is the correct actual width of the measured object. A block diagram of one mode of video processing of the signals generated by the present invention is shown in FIG. 12.

FIG. 12 illustrates a block diagram of one method for producing a parallel digital output for Video A 203, Video B 205 and XOR Video 207. The represented circuit produces a 12 bit binary output 209 with a magnitude representing the selected video signal. The Video Pre-Processor 131 and Video Select Switch 133 sections of the diagram are described in more detail in FIG. 10 and the accompanying description of that Figure.

The Sync. Pulse 211 that signals the end of one scan and the beginning of the next, is connected to the negative triggered input of an NE558 one-shot multivibrator 212. The Sync Pulse is also connected through a 4049 buffer/inverter 213 to another NE558 one-shot input 215. The second one-shot 215 produces the Latch (Store Counter) pulse 217 at the leading edge of the Sync Pulse. The first (non-inverted input) one-shot 212 produces the Reset Counter pulse 219 at the trailing edge of the Sync Pulse.

The Video signal selected by the Video Sel Switch circuit (see FIG. 10) is fed to one input of a 2 input NAND gate 221. The other input of the NAND gate is connected to a 200 kHz. crystal oscillator 223. Whenever the video signal from the Video Select Switch is at logic 1 the 200 kHz clock pulses are inverted and sent to the gate output 225. Any time the video signal is at logic 0 the gate output will be logic 1 with no clock pulses present.

The gate output is connected to a 12 bit binary counter 227. The counter is reset at the trailing edge of the Sync Pulse with the pulse 219 generated in the NE558 as described above. During the following scan, the counter counts all the clock pulses present while the selected video signal is at logic 1. On the leading edge of the Sync Pulse the Store Counter Pulse latches the counter output into a 12 bit latch circuit 229.

The 12 bit latch output can be read by a computer or microprocessor parallel input port any time during the following scan, while new data is being generated in the 12 bit binary counter 227. The computer can be used to select the video mode required and to alternate between Video A, Video B and XOR Video to collect data for binocular SCAN-A-LINE® calculations. FIGS. 13A and 13B show a preferred embodiment of the present invention for parallel processing of binocular video signals, which is analogous to FIG. 12 as described above.

Figure 13:
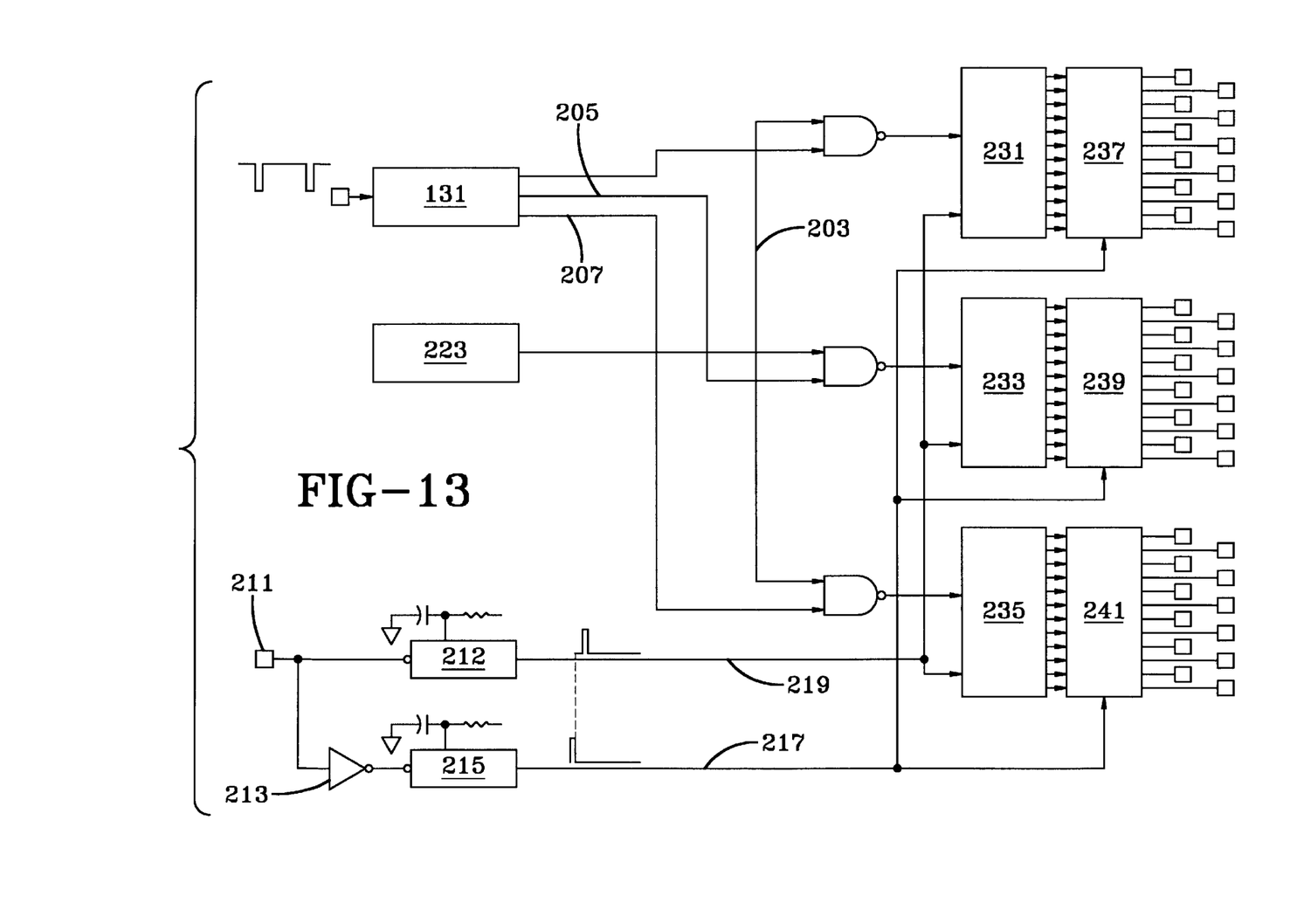
FIGS. 13A and 13B show a schematic block diagram of video processing of another embodiment of the present invention having parallel port data output.

As mentioned above, the sequential processing of the Video A, Video B and XOR Video signals can lead to problems if the material being measured moves during the scans required to read in the measurement data. To overcome this problem, the XOR Video signal can be processed as in FIG. 13. With all three Video signals present at the output of this circuit, it is possible to gate the 200 kHz. clock pulses to three 12 bit counters 231, 23, 235 independently. The outputs of these counters can be stored in three separate 12 bit latches 237, 239, 241. If Tri-State outputs are available on these latches as in the 74LS573 IC, the computer can select which latch to read and easily read all three video counts into memory while the following scan is progressing. This method represents the preferred method for Binocular SCAN-A-LINE® signal processing.

A somewhat lower cost measurement processing system can be designed around three 12 bit buffered digital to analog converters. In this method, the three counter outputs are stored in the latches provided within the digital to analog converter integrated circuits. The resulting analog outputs represent the three video signals as in the digital method. This analog method has some advantages where the measurement signal is used with analog input strip guiding or steering systems.

Figure 14:
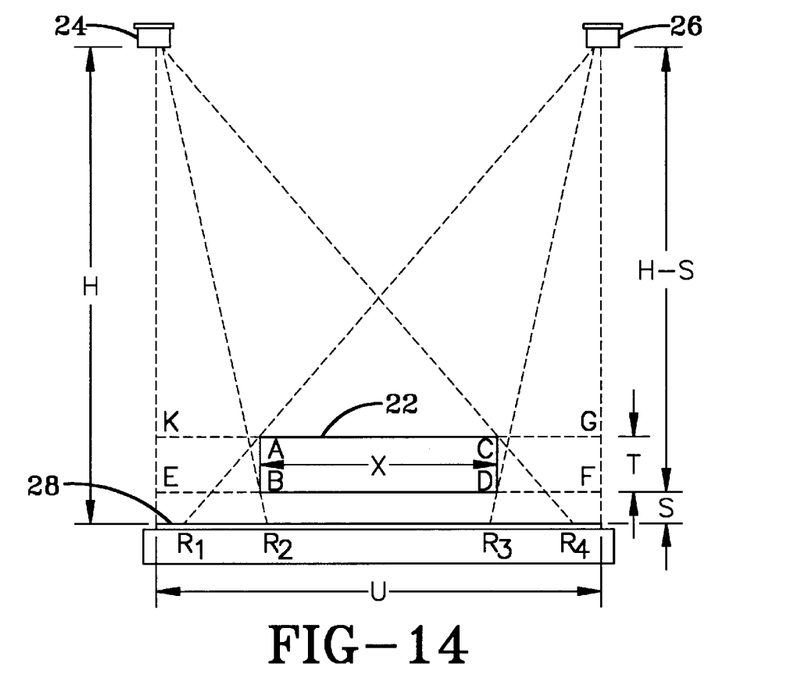
FIG. 14 is a diagrammatic view of an arrangement of the apparatus of the present invention for use with another workpiece thickness formula, where the workpiece is above the electromagnetic radiation source and between the ends of the electromagnetic radiation source.

Referring to FIG. 14, another arrangement for use with the present invention is shown in which processing of the gathered signal information can result in computation of workpiece width, thickness, and height above the emitter array. The letter designations R1, R2, R3, R4, H, T, S, and W are the same as described above in other embodiments. Location A is representative of the point in space where the upper left corner of the workpiece resides at any moment in time. The letter B is representative of the point and space at which the lower left corner of the workpiece resides. The letter C is representative of the point in space at which the upper right corner of the workpiece resides at any given time. The letter D is representative of the point in space at which the lower right corner of the workpiece resides. The letter K is representative of the point in space directly horizontal from point A and along the line of vertical cite of receiver 24 with the left edge of the emitter 28. The letter E is representative of the point in space directly horizontal from point B and in the same vertical line as point K. The letter G is representative of the point in space directly horizontal from the letter C and in the vertical line of cite of receiver 26 with the right edge of emitter 28. The letter F is representative of the point in space directly horizontal from point D and in the same vertical line as point G. With this arrangement, the following formulas apply:

$$\text{BY SIMILAR TRIANGLES, } \frac{EB}{R2} = \frac{H-S}{H} \text{ AND } \frac{DF}{W-R3} = \frac{H-S}{H}$$

$$\text{THEREFORE: } X = W - \left[\frac{H-S}{H}(R2+W-R3)\right] \text{WILL SOLVE WIDTH}$$

THE EXPRESSION (R2+W−R)=THE VIDEO LOGIC R3−R2
WHEN THE PASSLINE S, EMITTER RANGE W AND EMITTER TO RECEIVER SPACING H ARE GIVEN, THE WIDTH OF THE WORKPIECE CAN BE COMPUTED:

$$X = W - \left[\frac{H-S}{H}(R2-W+R3)\right]$$

THIS WIDTH MEASUREMENT IS INDEPENDENT OF THE WORKPIECE THICKNESS AS IT MEASURES ONLY THE EDGE NEAREST THE EMITTER.
COMPUTING WIDTH FROM THE TOP SURFACE:
BY SIMILAR TRIANGLES:

$$\frac{H}{H-(T+S)} = \frac{R4}{KC} \text{ AND } \frac{H}{H-(T+S)} = \frac{W-R1}{AG}$$

WIDTH $X = (AG + KC) - W$, THEREFORE:

$$X = R4\left[\frac{H-(T+S)}{H}\right] + W - R1\left[\frac{H-(T+S)}{H}\right] - W,$$

$$X + W = [R4 + (W-R1)]\left[\frac{H-(T+S)}{H}\right],$$

$$\frac{(X+W)H}{R4+R1-W} = H - S - T,$$

$$T = H - S - \left[\frac{(X+W)H}{R4+(W-R1)}\right] \quad \text{FORMULA TO SOLVE FOR } T \text{ THICKNESS}$$

Figure 15:
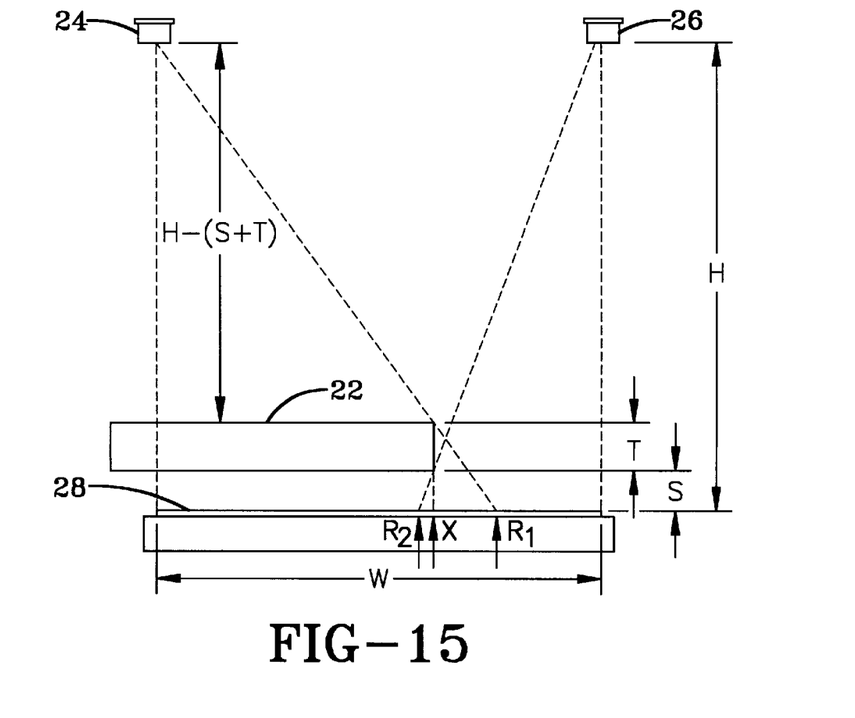
FIG. 15 is a diagrammatic view of an arrangement of the apparatus of the present invention for use with yet another workpiece thickness formula where the workpiece is above the electromagnetic radiation source and over one end of the electromagnetic radiation source.

Referring to FIG. 15, a electromagnetic radiation different arrangement is shown in which the workpiece has one edge that extends beyond the vertical emitance of the emitter array 28 and the opposite edge terminating at some point between the first and second edges 90, 92 of the emitter 28. The letter designation have all been defined above with the exception of the letter X. The letter X is indicative of the horizontal location along the emitter 28 which is directly vertically distanced below the right edge of the workpiece. By computing X, the thickness can be determined for the workpiece as set forth in the following formula:

TO FIND X, GIVEN S, BY SIMILAR TRIANGLES:

1) $\frac{W-R2}{H} = \frac{X}{H-S}, \quad X = (W-R2)\left[\frac{H-S}{H}\right]$

2) $\frac{H}{R1} = \frac{H-(S+T)}{X}, \quad X = R1\left[\frac{H-(S+T)}{H}\right]$

BUT X IS KNOWN FROM 1)

$HX = R1(H-S-T)$, SOLVED FOR T $T = H - \frac{HX}{R1} + S =$ THICKNESS OF WORKPIECE When a measurement is required for an object wider than the longest array available, two scanned arrays, each with a set of at least two receivers can be used. The arrays are preferably mounted with the beginning LEDs in the array toward the center of the workpiece with one array positioned under each edge of the workpiece to be measured. As the scan begins, the LEDs in both arrays are hidden from all four receivers. As the scan progresses, one of the two outside receivers will first see electromagnetic radiation from a LED because it can see electromagnetic radiation under the workpiece. If the workpiece is perfectly centered, the two outside receivers will see LED electromagnetic radiation at exactly the same time. At some point in time later in the scan, the receivers located interiorly over the arrays, will also see LED electromagnetic radiation. The greater the distance from the array to the workpiece, the greater will be the difference in view time for each edge.

In this arrangement, the width of the workpiece is again proportional to the total scan time during which the array is hidden from the receivers with a compensation factor for height as computed from the time difference on each edge. In addition, there is a constant offset to be added to the width calculation to allow for the separation between the ends of the arrays.

The present invention, as described above is susceptible to various changes and modifications that are fully intended to fall within the scope of the subjoined claims.

What is claimed is:
1. A measurement apparatus, comprising:
   at least two discrete electromagnetic radiation emitting devices, said devices located a distance from a first surface of a material workpiece, and extending partially outwardly from an edge of said workpiece, each of said devices being responsive to the application of current thereto to emit radiation;

a first receiver responsive to radiation emitting from said devices, said first receiver located at a stand-off distance from a second surface of said material;

a second receiver responsive to radiation emitting from said devices and located a stand-off distance from said second surface of said workpiece;

a drive circuit for applying said current to said discrete radiation emitting devices for actuating each of said emitting devices; and a processor for receiving first receiver signals from said first receiver and for receiving second receiver signals from said second receiver.

2. A method of measurement, comprising the steps of:

positioning at least two radiation emitting devices a distance from a first surface of a material workpiece, such that said devices extend partially outwardly from an edge of said workpiece;

positioning a first electromagnetic radiation receiver a stand-off distance from a second surface of said material workpiece, said first receiver responsive to said electromagnetic radiation emitted from said emitting devices;

positioning a second electromagnetic radiation receiver a stand-off distance from said second surface of said material workpiece, said second receiver responsive to said electromagnetic radiation emitted from said emitting devices;

actuating each of said emitting devices; and processing signals received from said first and said second receiver to arrive at said measurement.

* * * * *

UNITED STATES PATENT AND TRADEMARK OFFICE
CERTIFICATE OF CORRECTION

PATENT NO.   : 6,314,812 B1
DATED        : November 13, 2001
INVENTOR(S)  : David E. Harris It is certified that error appears in the above-identified patent and that said Letters Patent is hereby corrected as shown below:

Column 5,
Line 50, please delete the word "tens" and replace it with -- lens --;

Column 7,
Line 39, please delete the letter "P" and replace it with the letters -- R2 --.

Signed and Sealed this

Twenty-second Day of October, 2002

Attest:

JAMES E. ROGAN
Attesting Officer
Director of the United States Patent and Trademark Office